United States Patent [19]

DeGuevara

[11] Patent Number: 5,518,159
[45] Date of Patent: May 21, 1996

[54] ARTICLE SUPPORT RACK

[76] Inventor: Orlando DeGuevara, 211 W. Garfield Ave., Glendale, Calif. 91201

[21] Appl. No.: 300,431

[22] Filed: Sep. 2, 1994

[51] Int. Cl.[6] .............................. B60R 9/00; B60R 11/00
[52] U.S. Cl. ................. 224/488; 224/495; 224/502; 224/504; 224/505; 224/506; 224/507; 224/512; 224/924; 224/282
[58] Field of Search ................. 224/42.03 B, 42.08, 224/42.45 R, 280, 281, 282; 211/17, 18, 22; 414/462, 465

[56] References Cited

U.S. PATENT DOCUMENTS

| | | | |
|---|---|---|---|
| 3,529,737 | 9/1970 | Daugherty | 224/42.08 |
| 3,804,308 | 4/1974 | Bodde | 414/465 |
| 4,676,414 | 1/1987 | DeGuevara | 224/42.03 |
| 4,976,386 | 12/1990 | Geiger | 224/42.03 B |
| 5,094,373 | 3/1992 | Lovci | 224/42.08 |
| 5,330,084 | 7/1994 | Peters | 224/42.03 B |

*Primary Examiner*—Henry J. Recla
*Assistant Examiner*—Timothy L. Maust
*Attorney, Agent, or Firm*—J. E. Brunton

[57] ABSTRACT

An article carrier adapted to be detachably interconnected with a vehicle such as an automobile, truck or trailer. The article carrier includes a connector member adapted to be telescopically received within a tubular member affixed to the vehicle and a carrier assembly carried by the connector member and a fixed arm and a swingable arm to which a generally vertically extending column and one or more outwardly extending article supporting elements is connected. The fixed arm and the swingable arm are disposed in a side-by-side relationship and are uniquely interconnected so that the arc through which the swingable arm can swing is limited. A novel clamping mechanism is provided to securely interconnect the connector members of the device with the tubular hitch in a manner to positively prevent relative vibratory movement between the members.

16 Claims, 3 Drawing Sheets

ARTICLE SUPPORT RACK

BACKGROUND OF THE INVENTION

1. Field of the Invention

The present invention relates generally to article carriers adapted to be detachably interconnected to passenger vehicles to carry various articles such as bicycles. More particularly, the invention concerns an improved article carrier which is adapted to be detachably interconnected at the rear of vehicles such as automobiles and trucks having a conventional tubular receiving hitch.

2. Discussion of the Prior Art

In the past, various devices have been suggested for carrying articles such as bicycles, wheelchairs, skis and the like at either the front or the rear of passenger vehicles. Generally these prior art devices are detachably connected to the front or rear bumper of the vehicle by some type of clamping subassembly. Typically the clamping subassembly embodies mechanical fasteners, such as nuts, bolts, washers and the like and various hand tools are required to connect and disconnect the device. Such devices are often cumbersome and inconvenient to use because they require that proper tools be carried in the vehicle at all times to accomplish the interconnection of the carrier structure with the vehicle bumper.

Prior art article carriers such as bicycle carriers also exhibit other drawbacks. For example, they tend to be unstable and fragile and often require straps: or other support members which generally extend forwardly from the top member of the rack to engage something on the vehicle framework, such as the forward edge of a trunk cover or the like. Such devices are often difficult to mount and frequently are limited to use with vehicles of certain structural characteristics. Additionally such devices tend to work loose with normal road vibrations thereby constituting a serious safety hazard.

One of the most successful article carriers ever devised is disclosed in U.S. Pat. No. 4,676,414 issued to the present inventor. Another highly successful article carrier is disclosed in U.S. application, Ser. No. 08/192,733 filed Feb. 7, 1994. This application is hereby incorporated by reference as though fully set forth herein. The apparatus of the present invention constitutes an improvement of the apparatus described in previously identified U.S. Pat. No. 4,676,414 and patent application Ser. No. 08/192,733. The apparatus of the present invention can be easily and safely interconnected with standard tubular type trailer hitch.

Another prior art article carrier is disclosed in U.S. Pat. No. 5,094,373 issued to Lovci. This device is connectable to a vehicle hitch and embodies a swinging arm arrangement of a different character from that of the apparatus of the present invention. Unlike the Lovci device, the swinging support arm of the apparatus of the present invention is disposed in a side-to-side relationship with a fixed support arm and is uniquely provided with a novel safety stop feature that prevents the movable support arm from swinging through an arc greater than ninety degrees.

The improved apparatus of the present invention also uniquely couples the novel swinging arm support of the device with the unique securement and locking means described in U.S. Ser. No. 08/192,733. With this novel construction, the highly undesirable relative movement between the connector member of the article carrier and the square tube trailer hitch within which the connector member is telescopically received is virtually eliminated. Additionally, the improved apparatus of the present invention also prevents unauthorized removal of the article carrier from the vehicle trailer hitch.

SUMMARY OF THE INVENTION

It is an object of the present invention to provide an article carrier assembly, or support rack having a swingable support arm and fixed support arm which can be securely attached to a standard square tube trailer hitch of the character frequently provided on vehicles such as automobiles and trucks in a manner such that vibrating movement of the rack relative to the hitch is virtually eliminated.

It is another object of the invention to provide an article support rack of the aforementioned character in which the fixed and swingable support arms of the device are mounted in a side-by-side relationship and are interconnected in a manner such that the swingable support arm can swing only through a predetermined, limited arc.

Another object of the invention is to provide a support rack of the character described which, upon swinging the swingable arm away from the fixed arm, there will be no interference with the free opening of the trunk or rear door of the vehicle.

Still another object of the invention is to provide a support rack of the class described which is lightweight and durable and can be affixed to the vehicle without the need for any type of special tools.

DESCRIPTION OF THE INVENTION

Figure 1:
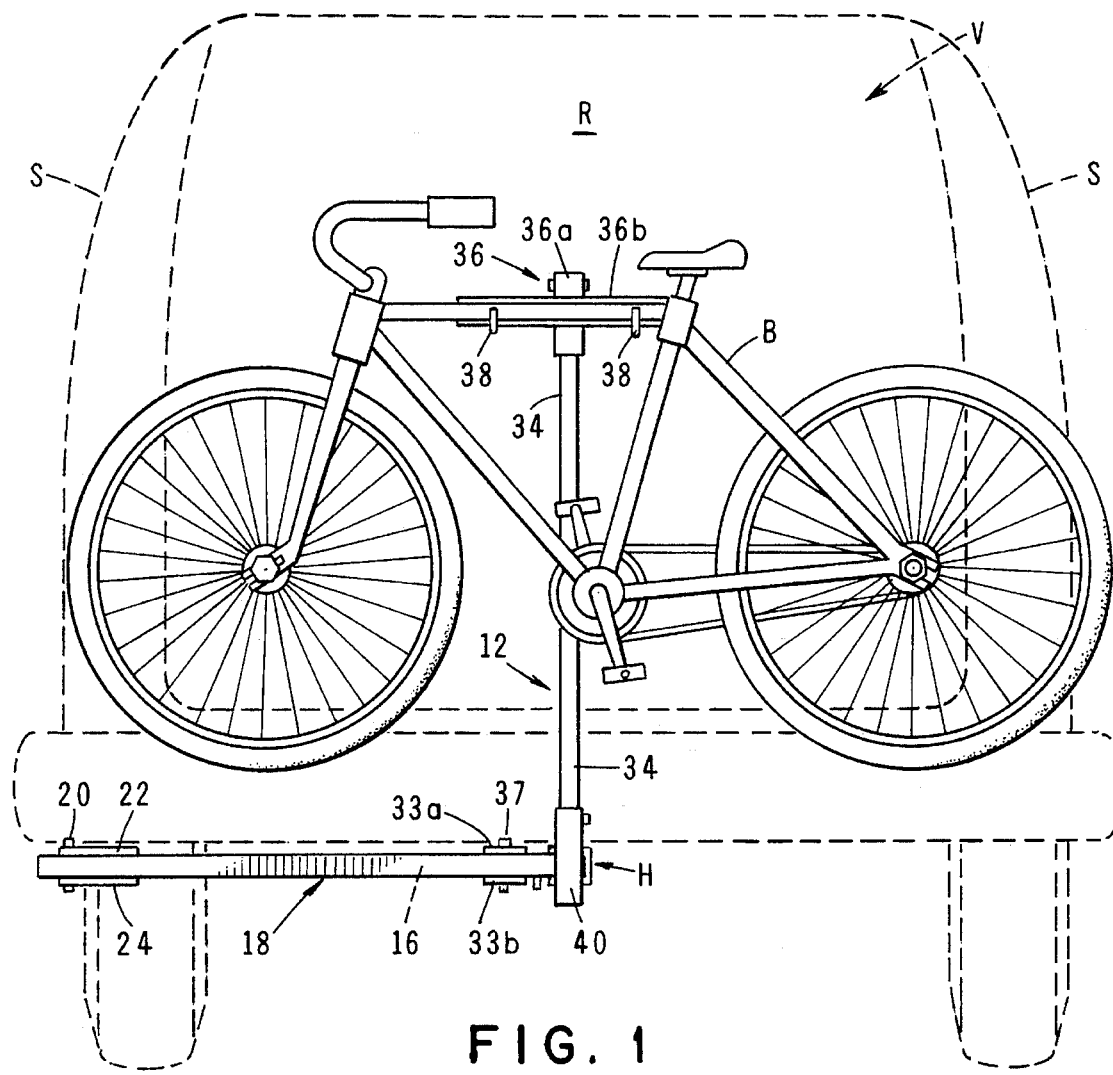
FIG. 1 is a generally diagrammatic view illustrating the article support rack assembly of the invention affixed to the rear of a passenger vehicle and showing a bicycle supported on the article supporting mechanism of the rack assembly.
Figure 2:
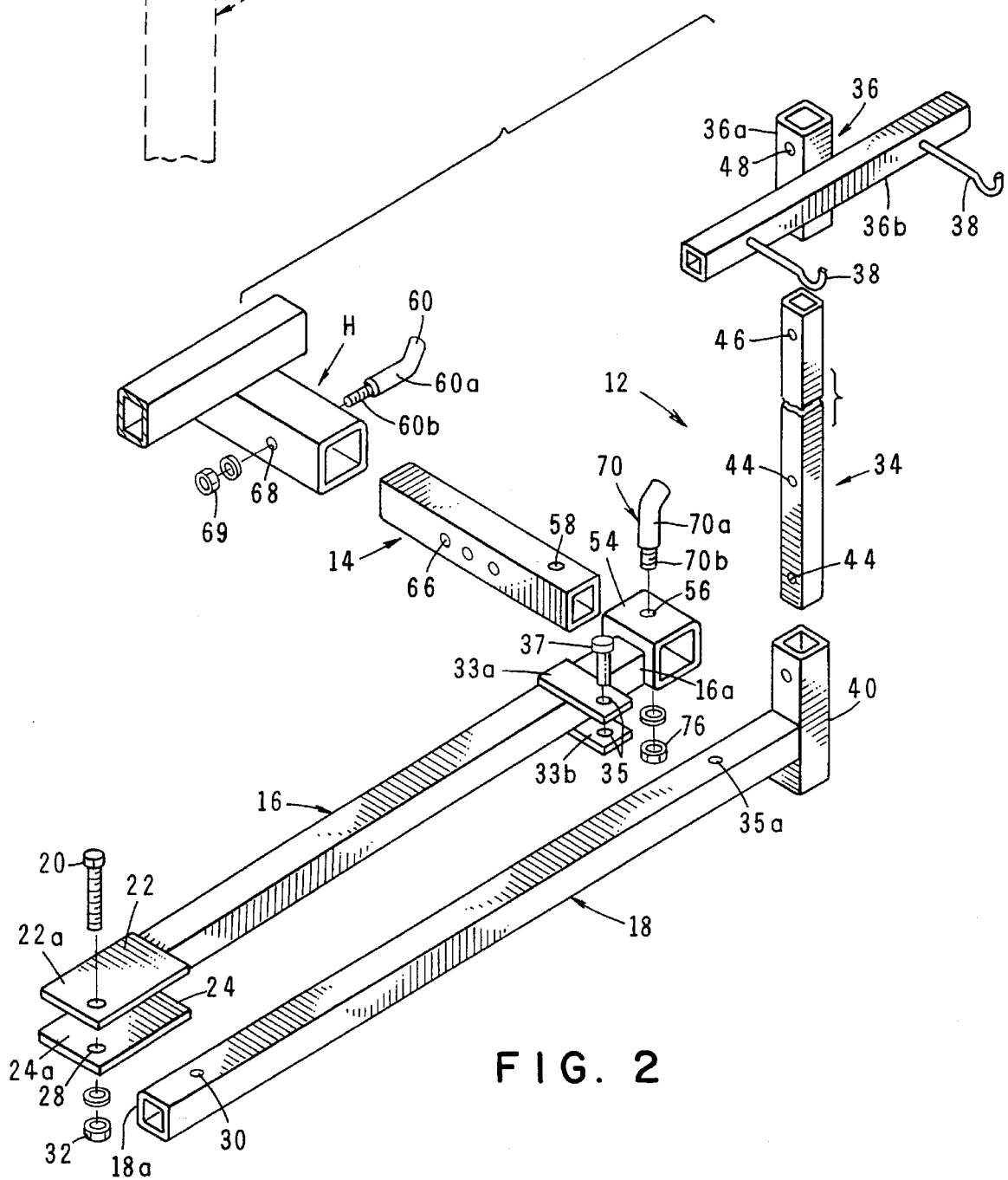
FIG. 2 is a generally perspective, exploded view of one form of the article support rack assembly of the invention and of a tubular vehicle hitch of the character to which the assembly is to be connected.
Figure 3:
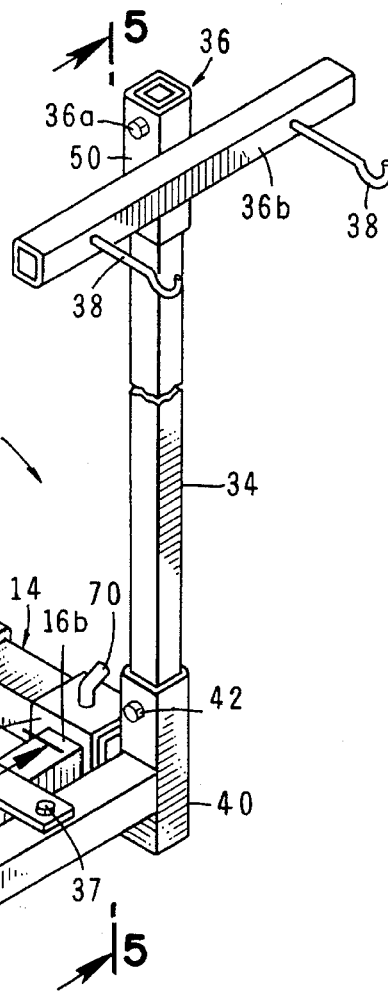
FIG. 3 is a generally perspective view of the article support rack assembly of FIG. 2 as it appears in an assembled configuration and interconnected with the tubular vehicle hitch.
Figure 3:
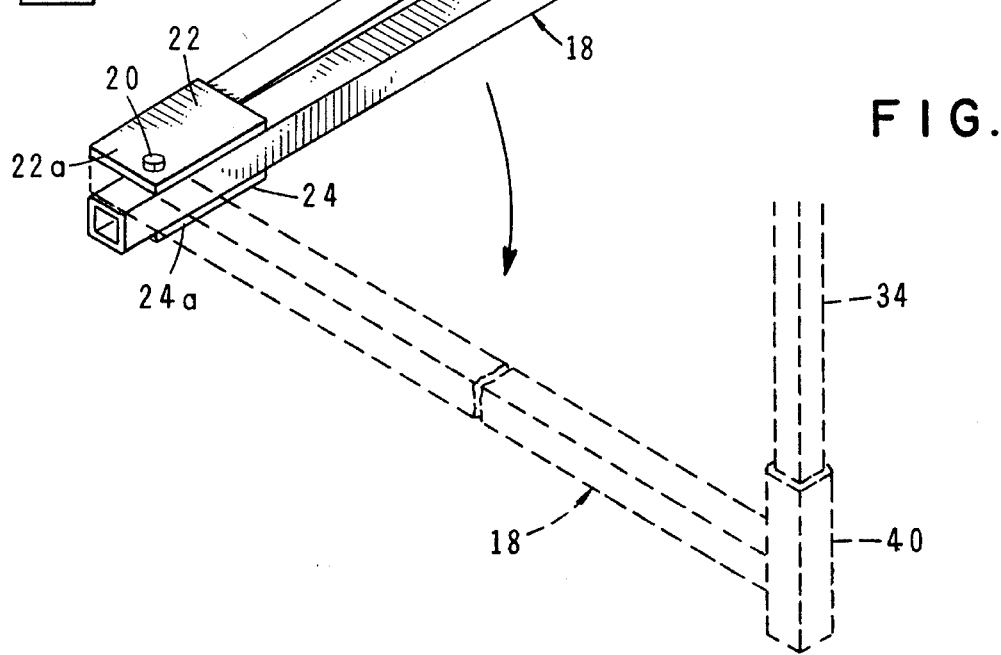

Referring to the drawings and particularly to FIGS. 1, 2, and 3, one form of the article support rack assembly of the present invention is there shown and generally designated by the numeral 12. The assembly is adapted to be detachably interconnected with a vehicle such as vehicle "V" having spaced apart sides "S" a rear end "R" and a tubular trailer hitch "H" affixed to the rear end of the vehicle (FIG. 1). As is generally the case, the tubular hitch "H" of the vehicle is disposed proximate the center of the rear end of the vehicle at a location approximately equidistant between sides "S" of the vehicle.

Turning particularly to FIGS. 2 and 3, the article support rack assembly here comprises a tubular connecting member 14, means for interconnecting member 14 with hitch "H", a fixed arm 16 which is connectable to tubular connector member 14 and a movable or swingable arm 18 which is pivotally interconnected with fixed arm 16 by connector means, the details of which will presently be described.

As best seen in FIG. 3, movable arm 18 is disposed in a coplanar relationship with fixed arm 16 and is swingable relative thereto between first and second positions, the second position being shown by the dotted lines of FIG. 3. As indicated in FIG. 3, arm 18 is swingable substantially within the plane of fixed member 16.

As indicated in FIG. 1, fixed arm 16 is of a length substantially equal to one-half the distance between the sides "S" of the vehicle and terminates in an outboard end 16a (FIG. 4) which is disposed proximate one side of the vehicle.

An important feature of the apparatus of the present invention is the connector means which functions to interconnect the movable arm with the fixed arm. As will presently be described, the novel connector means also functions to controllably restrict the movement of arm 18 to a fixed arc of approximately 90 degrees (see FIG. 3).

Figure 4:
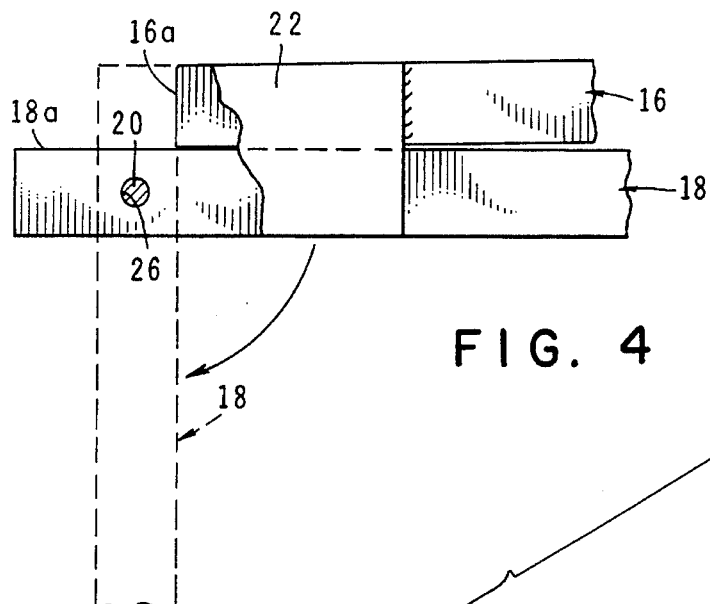
FIG. 4 is a fragmentary top-plan view illustrating the manner of interconnection of the movable arm of the apparatus and the fixed arm of the apparatus.

Turning once again to FIG. 2, it is to be noted that the connector means of the invention here comprises a threaded pivot pin 20 and first and second spaced-apart flat connector plates 22 and 24, both of which are affixed to fixed member 16 proximate end 16a thereof (FIG. 4). More particularly, connector plate 22 is connected to the top wall of member 16 while connector plate 24 is connected to the bottom wall thereof. Each connector plate is provided with an outboard portion which extends beyond end 16a of fixed member 16. These outboard portions, which are identified as 22a and 24a, are provided with aligned bores 26 and 28 respectively which are adapted to receive pin 20. Movable member 18 is also provided with a bore 30 which is indexable with bores 26 and 28 provided in connector plates 22 and 24. As indicated in FIG. 3, when bore 30 is moved into index with bores 26 and 28, pivot pin 20 can be inserted into bore 26 and will then extend through bore 30 and through bore 28 so that a fastener such as nut 32 (FIG. 2) can be threadably connected to the pivot pin to maintain arms 16 and 18 in the pivotally interconnected relationship shown in FIG. 3.

With members 16 and 18 interconnected in the manner described in the preceding paragraph, member 18 can be swung from the first position shown in FIG. 3 to the second position shown in the dotted lines of FIG. 3 (see also FIG. 4). An extremely important feature of the apparatus of the invention resides in the fact that as member 18 swings into its second position, the side wall portion 18a thereof (FIG. 4), will move into engagement with outboard end 16a of member 16 so as to block movement past a ninety degree arc. This unique feature of the invention limits the angle through which swinging arm 18 can travel thereby preventing the article carried by the device from swinging dangerously into the path of ongoing or passing traffic. In those prior art devices that do not include this important safety feature, the swinging arm can swing through an angle greater than ninety degrees thereby permitting the article carried by the apparatus to swing dangerously out of the general plane of the side of the vehicle and into the path of passing traffic. By positively limiting the angle through which member 18 can pivot to about ninety degrees, this dangerous aspect of the prior art apparatus is positively corrected.

A further important safety feature of the device of the present invention comprises interlocking means for locking member 18 to member 16 when the apparatus is in the stowed position shown in FIG. 3. This interlocking means here comprises first and second locking plates 33a and 33b which are connected as by welding to the upper and lower surfaces of member 16 at a location proximate the inboard end of member 16. Each of these plates is provided with an aperture 35 which is indexable with an aperture 35a provided in member 18. When member 18 is swung into a closed position against member 16, a lock pin 37 is inserted into apertures 33 and 35 to prevent member 18 from swinging away from member 16.

Referring once again to FIGS. 2 and 3, it can be seen that the article support rack assembly of the invention further includes a column 34 which is connectable to swinging member 18 so that it extends upwardly therefrom. Additionally, the assembly includes article support means that is connected to column 34 for supporting the article to be carried, such as the bicycle "B" shown in FIG. 1. While the article supporting means can be provided in a number of different configurations so that it can support a number of different kinds of articles such as skis wheel chairs and other velocipedes, the article supporting means shown in the drawings comprises a cross-bar assembly 36 which is connected with column 34 in the manner shown in FIG. 3. More particularly, cross-bar assembly 36 includes a member 36a which is telescopically received over the upper end of column 34 and a cross-bar 36b which is connected to member 36a and extends generally perpendicularly thereto. Extending outwardly from cross-bar 36b is a pair of article support members 38 which support the article to be carried such as bicycle "B" (FIG. 1).

Figure 5:
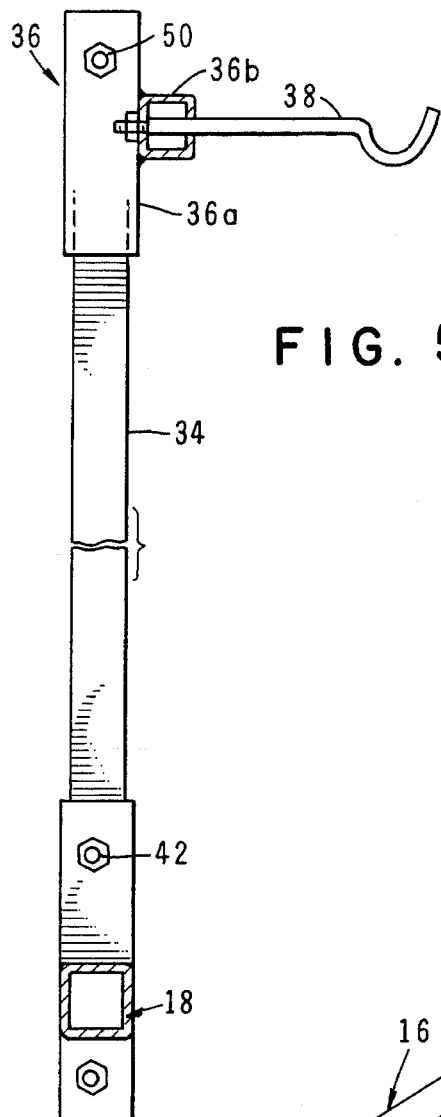
FIG. 5 is a cross-sectional view taken along lines 5—5 of FIG. 3.

As best seen by referring to FIGS. 2 and 3, column 34 is interconnected to arm 18 by means of a tubular connector member 40 within which the lower end of column 34 is telescopically received in the manner shown in FIG. 3. Column 34, as well as member 40, which is preferably welded to member 18, are provided with apertures which can be moved into alignment so as to receive a connector, such as a bolt 42, of the character shown in FIG. 3. As indicated in FIG. 2, a plurality of apertures 44 are provided in column 34 so that the height of the cross-bar assembly of the article supporting means can be vertically adjusted relative to swinging member 18. Member 34 is also provided with an aperture 46 which is located proximate the top of the column. Aperture 46 is indexable with an aperture 48 which is provided in member 36a so that the cross-bar assembly 36 can be interconnected with column 34 using a connector such as bolt 50 (see FIGS. 3 and 5).

Figure 6:
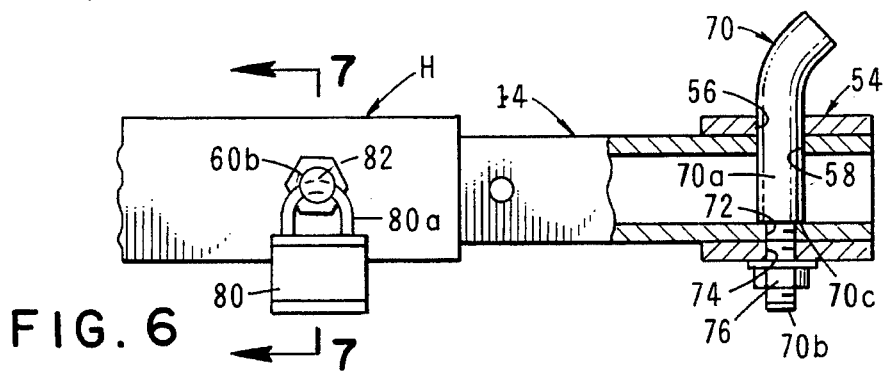
FIG. 6 is a cross-sectional view taken along lines 6—6 of FIG. 3.

Turning next now to FIG. 6, it is to be noted that connector member 14 is interconnected with fixed member 16 by means of a connector sleeve 54 which is welded to member 16 at a location proximate its inboard end 16b. Sleeve 54 is provided with an aperture 56 which is alignable with an aperture 58 provided in connector member 14 when the connector member is telescopically received within sleeve 54 in the manner shown in FIGS. 3 and 6. Connector member 14 is interconnected with sleeve 54 by means of a second interconnection means which is of the same character as the first interconnection means which is used to interconnect connector member 14 with tubular trailer hitch "H". These highly novel interconnection means, the details of which will presently be described, secure the connector member against both inward and outward movement relative to tubular hitch "H" and sleeve 54 as well as sideways movement with respect thereto and with respect to the vehicle "V". More particularly, the second interconnection means, which is used to connect the outboard end of connector 14 with sleeve 54 uniquely functions to secures the outboard end of member 14 against inward and outward movement relative to sleeve 54 as well as against sideward movement with respect thereto.

Figure 7:
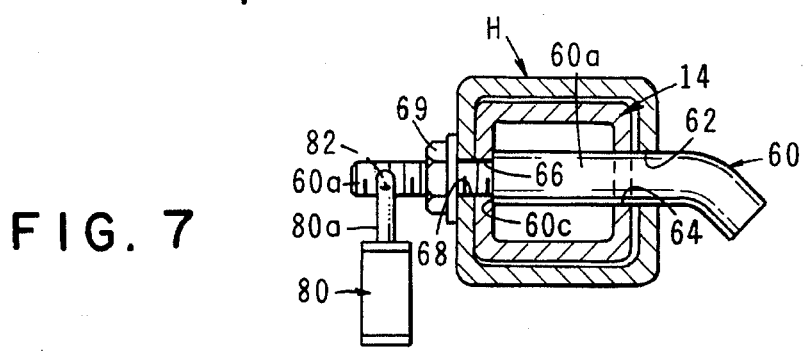
FIG. 7 is a cross-sectional view taken along lines 7—7 of FIG. 6.

One form of the first interconnection means of the present invention is illustrated in FIG. 7 and includes a connector member 60. Member 60 has a first portion 60a which is closely receivable within a first aperture 62 provided in hitch "H" and within a first bore 64 provided in connector member 14. Member 60 also includes a second threaded portion 60b which is of smaller diameter than portion 60a. A shoulder 60c is defined at the junction of portions 60a and 60b. As indicated in FIG. 7, portion 60b is closely receivable within a second bore 66 provided in connector 14 and also within second aperture 68 of hitch "H". Apertures 66 and 68 are preferably of smaller diameter than apertures 62 and 64. A nut 69 is threadably interconnectable with threaded portion 60b in the manner shown in FIG. 7.

When member 60 is fully inserted in the manner shown in FIG. 7, shoulder 60c engages the inner wall of connector member 14 so that, upon tightening nut 69, the external surface of connector member 14 will be securely clamped against the inner surface of the wall of the hitch member thereby positively preventing relative movement between hitch "H" and connector member 14.

In prior art devices, which do not embody the important clamping feature described in the preceding paragraph, clearance between the connector member of the article carrier apparatus and the tubular hitch member promotes a highly undesirable vibratory movement of the carrier assembly. When prior art carrier devices are mounted on a trailer, this vibratory movement could become so severe that either the connector member or the hitch member would fracture causing catastrophic separation of the article carrier apparatus from the vehicle. When such separation occurred on the highway, the article being carried could be severely damaged or destroyed and a significant highway safety hazard could result. However, when the telescoping parts are securely and positively clamped together by the connector means of the present invention in the manner shown in FIG. 7, swinging or vibratory motion of the article carrier apparatus relative to the hitch is positively prevented.

The second interconnection means of the invention, namely that used to interconnect sleeve 54 with connector member 14, here comprises a connector member 70. Turning particularly to FIG. 6, it is to be noted that sleeve 54 is provided with aperture 56 which is of a smaller diameter to aperture 58 which is provided in the outboard end of connector member 14. Member 70 functions to securely and positively clamp together connector member 14 and sleeve 54 in the manner previously described. More particularly, member 70 has a first portion 70a and a threaded shank portion 70b. Portion 70a is closely receivable within apertures 56 and 58 while shank portion 70b is closely receivable within a second aperture 72 provided in member 14 and within a second aperture 74 provided in sleeve 54. When member 70 is fully inserted into the telescoping assembly in the manner shown in FIG. 7, a shoulder 70c formed on member 70 will engage the inner wall of tubular member 14 and threaded portion 70b will extend through aperture 74. When a nut 76 is then threadably connected to shank portion 70b and tightened down, the outer surface of connector member 14 will be urged into secure clamping engagement with the inner surface of sleeve 54, thereby clamping the member together in a manner to positively prevent relative movement therebetween.

Also forming a part of the present invention, is locking means for preventing removal of the assembly from the hitch "H". The locking means here comprises a padlock 80 having a shackle 80a which is closely receivable within an aperture 82 formed in threaded portion 60b of member 60 (FIG. 6). With this construction, when member 14 is telescopically positioned within hollow trailer hitch "H" to form a telescoping assembly and the members are clamped together in the manner previously described, shackle 80a of padlock 80 can be inserted into aperture 82 (FIG. 7) thereby preventing removal of member 14 from hitch "H".

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An article support rack assembly adapted to be detachably interconnected with a vehicle having sides spaced apart by a first distance, a rear end spanning said sides, and a tubular hitch, said support rack assembly, comprising:

(a) a tubular connecting member;

(b) interconnection means for interconnecting said tubular connecting member with the tubular hitch whereby said member extends outwardly from the rear end of the vehicle and is secured against both inward and outward movement relative thereto as well as movement side ways with respect to the vehicle;

(c) a fixed arm connected to said tubular connecting member and extending substantially perpendicular thereto, said arm adapted to be disposed within a generally horizontal plane with respect to said vehicle and having an outer side surface and an inner side surface spaced from said outer side surface in a direction toward the rear end of the vehicle;

(d) a movable arm disposed in a coplanar relationship with said fixed arm for swinging movement relative thereto substantially within said plane, said movable arm having an outer side and an inner side spaced from said outer side in a direction toward the rear of the vehicle, said movable arm having an inner side surface and being movable from a first position wherein said inner side surface thereof is proximate said outer side surface of said fixed arm to a second position wherein said movable arm extends angularly from said fixed arm in said plane;

(e) connector means for connecting said movable arm to said fixed arm and for restricting movement of said movable arm within a fixed arc;

(f) a column connected to said movable arm and extending therefrom; and (g) article supporting means connected to said column for supporting the article to be carried.

2. An assembly as defined in claim 1 in which said fixed arm is of a length substantially equal to one-half the first distance between the sides of the vehicle, said fixed arm terminating in an outboard end disposed proximate one side of the vehicle.

3. An assembly as defined in claim 2 in which said connector means comprises a pair of spaced-apart connector plates affixed proximate said outboard end of said fixed arm.

4. An assembly as defined in claim 3 in which each of said connector plates includes an outboard portion which extends beyond said outboard end of said fixed arm.

5. An assembly as defined in claim 4 in which said movable arm has a bore therethrough and in which said outboard portions of said connector plates each have a bore therethrough indexable with said bore in said movable arm.

6. An assembly as defined in claim 5 in which said movable arm has a first and second end and in which said assembly further includes a pivot pin receivable through said bore in said movable arm and said bores in said sides outboard portions of said connector plates whereby said movable arm is pivotable from a first position parallel with said fixed arm to a second position substantially perpendicular to said fixed arm wherein said movable arm is in engagement with said outboard end of said fixed arm.

7. An article support rack assembly adapted to be detachably interconnected with a vehicle having sides spaced apart by a first distance, a rear end spanning said sides, and a tubular hitch, said support rack assembly, comprising:

(a) a tubular connecting member;

(b) interconnection means for interconnecting said tubular connecting member with the tubular hitch;

(c) a fixed arm connected to said tubular connecting member and extending substantially perpendicular thereto, said arm being disposed within a plane, and having an outer side and an inner side spaced from said outer side in a direction toward the rear of the vehicle, said fixed arm being of a length substantially equal to one-half the first distance between the sides of the vehicle, and terminating in an outboard end adapted to be disposed proximate one side of the vehicle;

(d) a movable arm disposed in a coplanar relationship with said fixed arm for swinging movement relative thereto between first and second positions substantially within said plane, said movable arm having a bore therethrough and wherein said inner side is proximate said outer side of said fixed arm when said movable arm is in said first position;

(e) connector means, including a pivot pin, for connecting said movable arm to said fixed arm and for restricting movement of said movable arm within a fixed arc, said connector means comprising a pair of spaced-apart connector plates affixed proximate said outboard end of said fixed arm, each of said connector plates having an outboard portion which extends beyond said outboard end of said fixed arm, each said outboard end having a bore therethrough indexable with said bore in said movable arm, said pivot pin being receivable through said bores in said connector plates and through said bore in said movable arm;

(f) a column connected to said movable arm and extending therefrom; and (g) article supporting means connected to said column for supporting the article to be carried.

8. An assembly as defined in claim 7 in which said movable arm is pivotable about said pivot pin from a first position parallel with said fixed arm to a second position substantially perpendicular to said fixed arm wherein said movable arm is in engagement with said outboard end of said fixed arm.

9. An assembly as defined in claim 7 in which said interconnection means secures said tubular connector member to the tubular hitch to substantially prevent inward, outward, and sideways movement of said connector member relative to the tubular hitch.

10. An assembly as defined in claim 9 in which the tubular hitch of the vehicle includes a wall defining an external surface and an internal passageway, said wall having a first aperture of a first size and a second, oppositely disposed aperture of a second smaller sizes and in which said tubular connecting member is telescopically receivable within the tubular hitch and is provided with a first bore of a size approximating the size of the first aperture in the tubular hitch and a second bore in axial alignment with said first bore, and in which said interconnection means further includes a member having:

(a) a first portion receivable within said first aperture of the tubular hitch and within said first bore of said tubular connecting member;

(b) a second threaded portion contiguous with said first portion, said second threaded portion being receivable within said second bore in said tubular connecting member and being receivable within and extending through the second aperture of the tubular hitch;

(c) engaging means for engaging said tubular connecting member; and (d) means for urging said engaging means into pressural engagement with said tubular connecting member whereby said tubular connecting member is urged into pressural engagement with the tubular hitch thereby preventing relative movement between said tubular connecting member and the tubular hitch.

11. An article support rack assembly adapted to be detachably interconnected with a vehicle having sides spaced apart by a first distance, a rear end spanning said sides, and a tubular hitch, said support rack assembly, comprising:

(a) a tubular connecting member having an inboard end and an outboard end;

(b) first interconnection means for interconnecting said inboard end of said tubular connecting member with the tubular hitch;

(c) a fixed arm connected to said outboard end of said tubular connecting member and extending substantially perpendicular thereto, said arm being disposed within a plane, said fixed arm being of a length substantially equal to one-half the first distance between the sides of the vehicle, and terminating in an outboard end disposed proximate one side of the vehicle;

(d) second interconnection means for interconnecting said outboard end of said tubular member with said fixed arm;

(e) a movable arm disposed in a coplanar relationship with said first arm for swinging movement relative thereto substantially within said plane said movable arm having a bore therethrough;

(f) connector means, including a pivot pin, for connecting said movable arm to said fixed arm and for restricting movement of said movable arm within a fixed arc, said connector means comprising a pair of spaced-apart connector plates affixed proximate said outboard end of said fixed arm, each of said connector plates having an outboard portion which extends beyond said outboard end of said fixed arm, each said outboard end having a bore therethrough indexable with said bore in said movable arm, said pivot pin being receivable through said bores in said connector plates and through said bore in said movable arm;

(g) a column connected to said movable arm and extending therefrom; and (h) article supporting means connected to said column for supporting the article to be carried.

12. An assembly as defined in claim 11 in which said movable arm is pivotable about said pivot pin from a first position parallel with said fixed arm to a second position substantially perpendicular to said fixed arm wherein said movable arm is in engagement with said outboard end of said fixed arm.

13. An assembly as defined in claim 12 further including interlocking means for locking said movable arm in said first position.

14. An assembly as defined in claim 12 in which said first interconnection means secures said tubular connector member to the tubular hitch to substantially prevent inward, outward, and sideways movement of said connector member relative to the tubular hitch.

15. An assembly as defined in claim 12 in which said fixed arm includes a tubular sleeve portion and in which said second interconnection means secures said outboard end of said tubular connector member to said tubular sleeve to substantially prevent inward, outward, and sideways movement of said connector member relative to said tubular sleeve portion.

16. An assembly as defined in claim 15 in which the said tubular sleeve includes a wall defining an external surface and an internal passageway, said wall having a first aperture of a first size and a second, oppositely disposed aperture of a second smaller size, and in which said outboard end of said tubular connecting member is telescopically receivable within said tubular sleeve and is provided with a first bore of a size approximating the size of said first aperture in said tubular sleeve and a second bore in axial alignment with said first bore, and in which said second interconnection means further includes a member having:

(a) a first portion receivable within said first aperture of said tubular sleeve and within said first bore of said outboard end of said tubular connecting member;

(b) a second threaded portion contiguous with said first portion, said second threaded portion being receivable within said second bore in said outboard end of said tubular connecting member and being receivable within and extending through the second aperture of said tubular sleeve;

(c) engaging means for engaging said outboard end of said tubular connecting members; and (d) means for urging said engaging means into pressural engagement with said outboard end of said tubular connecting member whereby said tubular connecting member is urged into pressural engagement with said tubular sleeve thereby preventing relative movement between said tubular connecting member and said tubular sleeve.

* * * * *